United States Patent [19]

George et al.

[11] 4,339,872
[45] Jul. 20, 1982

[54] APPARATUS AND METHOD FOR WINDING ARMATURES

[75] Inventors: Robert D. George; Robert P. Hoy, both of Dayton, Ohio

[73] Assignee: Mechaneer, Inc., Dayton, Ohio

[21] Appl. No.: 175,905

[22] Filed: Aug. 6, 1980

[51] Int. Cl.³ ............................................. H02K 15/09
[52] U.S. Cl. ..................................... 29/597; 29/564.6; 29/736; 242/7.03; 242/7.05 B
[58] Field of Search ................. 29/597, 598, 732, 736, 29/564.6; 242/7.03, 7.05 R, 7.05 B, 7.05 C

[56] References Cited

U.S. PATENT DOCUMENTS

| | | | |
|---|---|---|---|
| 3,857,172 | 12/1974 | George et al. | 29/597 |
| 3,921,284 | 11/1975 | Bucholtz et al. | 29/597 |
| 4,052,783 | 10/1977 | Shively | 29/597 |

Primary Examiner—Carl E. Hall
Attorney, Agent, or Firm—Jacox & Meckstroth

[57] ABSTRACT

An armature includes a shaft supporting a slotted core and a commutator having peripherally spaced hook-like tangs. The armature is automatically wound on a flyer-type winding machine which has a set of concentric tubular shields surrounding the commutator and a pair of wire gripper units diametrically arranged relative to the shields. The gripper units are pivotally supported by a member which surrounds the shields and is supported for rotation on the axis of the armature shaft. A set of fluid cylinders are arranged to rotate or index the member and gripper units between a lead pick-up position and a lead terminating position through an intermediate winding position to provide for faster winding of each armature.

14 Claims, 3 Drawing Figures

APPARATUS AND METHOD FOR WINDING ARMATURES

BACKGROUND OF THE INVENTION

In the winding of an armature of the type which includes an armature shaft supporting a slotted core and a commutator having peripherally spaced hook-like tangs, it is desirable to use an automatic armature winding machine of the general type disclosed in George et al U.S. Pat. No. 3,857,172 which issued to the assignee of the present invention, and as also disclosed in the other U.S. Patents referred to in George et al patent. This general type of winding machine is commonly referred to as a double flyer-type armature winding machine and is frequently used to form an "alpha-type" connection between wire leads extending from each wound coil and its corresponding commutator tangs. "Alpha-type" lead connections are disclosed in British Pat. No. 942,926 and in above-mentioned U.S. Pat. No. 3,857,172.

When winding some armatures which have coils of extra fine wire, it is sometimes necessary to wrap the starting lead wire for the first coil more than once around its corresponding tang, for example, as disclosed in U.S. Pat. No. 3,713,208, to prevent the starting lead wire from unwrapping from the tang due to the tension within the wire extending from its corresponding flyer and before the first coil is wound. However, it has been found that the double or multiple wrapping of the starting lead wire for each coil around a commutator tang requires extra operations of the winding machine and increases the total time for winding each armature.

SUMMARY OF THE INVENTION

The present invention is directed to an improved armature winding apparatus and method which eliminates the need for multiple or double wrapping the lead wire around a commutator tang and, as a result, decreases the total time for automatically winding armatures which are wound with extra fine wire. In general, the features and advantages of the present invention are provided by mounting the lead wire gripping units, as disclosed in above-mentioned U.S. Pat. No. 3,857,172 on a collar or member which is located concentrically with the commutator shields. The member is supported for substantial angular rotation on the axis of the armature shaft, and power operated means are provided for rotating or indexing the assembly of the member and wire gripper units between a lead pick-up position and a lead terminating position through an angle of over 90 degrees. The rotating means for the assembly also provide for positioning the gripper units at an intermediate position during the winding of the coils on the armature core so that the winding operation may be performed at maximum speed.

Other features and advantages of the invention will be apparent from the following description, the accompanying drawings and the appended claims.

DESCRIPTION OF THE PREFERRED EMBODIMENTS

Figure 1:
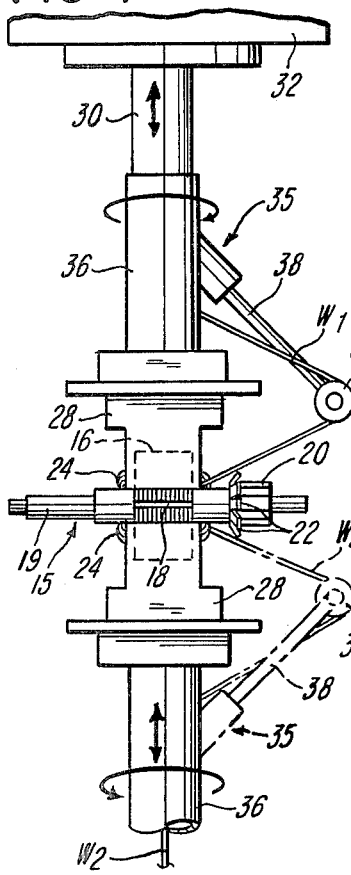
FIG. 1 is a fragmentary plan view of a double flyer-type armature winding machine and illustrating the position of an armature at the winding station and during the winding operation.

Referring to FIG. 1, the automatic winding machine constructed in accordance with the invention is particularly suited for winding an armature 15 consisting of a laminated core 16 having peripherally spaced slots 18 and rigidly secured to an armature shaft 19. The shaft 19 also supports a commutator 20 having peripherally spaced commutator segments each having a hook-like tang 22 projecting outwardly from the inner end of the commutator. In a conventional manner, the slots 18 receive corresponding wire coils 24 which are formed by simultaneously winding a set of supply wires W1 and W2. Each of the coils 24 has wire leads which are connected to predetermined tangs 22 by simply hooking tha tangs or by alpha-type loop connections. The commutator tangs 22 are subsequently hot-staked to the corresponding wire leads to form electrical connections between the wire leads and the corresponding segments or bars of the commutator 20.

The successive winding of the wire coils 24 is performed while the armature core 16 is gripped or retained by a pair of opposing wire forming chucks 28 each having a semi-cylindrical center cavity conforming to the curvature of the core 16. Each of the chucks 28 is supported by an antifriction bearing (not shown) mounted on the outer end portion of a corresponding tubular spindle 30 through which the corresponding wire is supplied. Each of the spindles 30 is supported for both rotary and axial movement by suitable bearings located within a corresponding housing portion 32 of the armature winding machine.

A flyer assembly 35 is rigidly secured to each of the spindles 30 for rotation therewith and includes a hub portion 36 which supports an outwardly projecting flyer arm 38. A wire guide roller 39 is mounted on the outer end portion of each flyer arm 38 for guiding the corresponding wire, and the opposing flyer assemblies 35 rotate in opposite directions during operation for winding each pair of coils 16.

Figure 2:
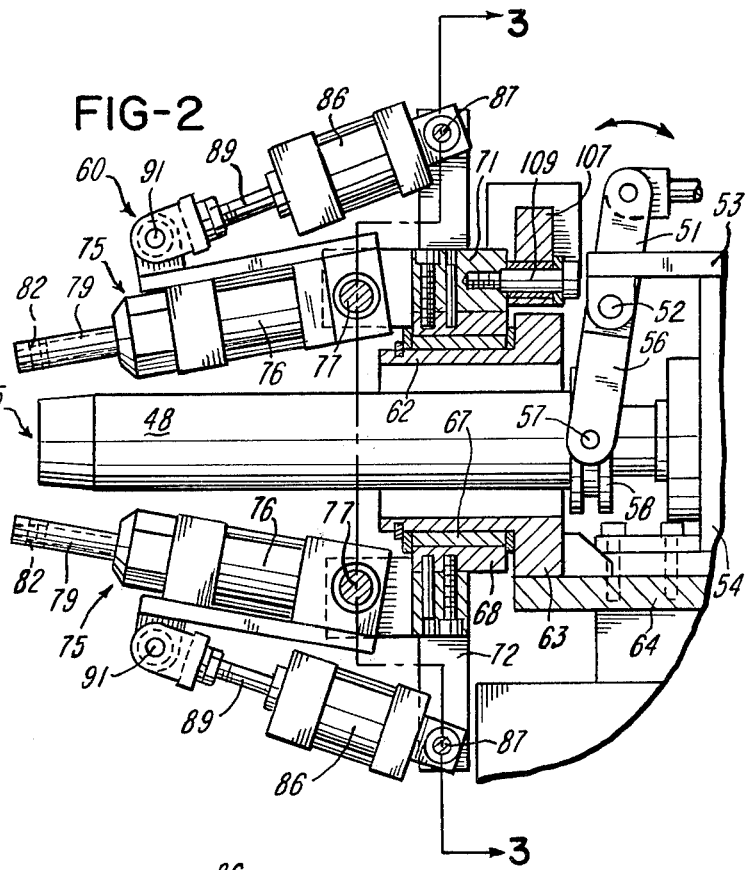
FIG. 2 is a partial axial section through a lead wire gripper assembly constructed in accordance with the invention and which is enlarged relative to the portion of the armature winding machine shown in FIG. 1.

Referring to FIG. 2, a shield assembly 45 forms part of the armature winding machine and is axially aligned with the armature shaft 19 at the commutator end of the armature. The shield assembly 45 may be constructed in a manner as disclosed in above-mentioned U.S. Pat. No. 3,857,172 and includes a cylindrical non-rotative inner shield or sleeve 46 which surrounds an armature shaft gripper and indexing shaft (not shown), and the sleeve 46 is surrounded by an outer cylindrical shield or sleeve 48. The outer sleeve 48 is supported for axial movement on the inner sleeve 46 in response to pivoting of a lever 51 supported by a pivot pin 52 connected to a bracket 53 secured to a frame portion 54 of the armature winding machine. The lower end portion of the lever 51 is formed by a yoke 56 which has a pair of opposing roller pins 57 projecting inwardly into a grooved collar 58 secured to the outer sleeve 48 to permit free rotation of the outer shield 48 and thereby minimize wear on the roller pins 57 and collar 58.

In accordance with the present invention, a wire gripping assembly 60 surrounds the shield assembly 45 and includes a concentrically positioned cylindrical sleeve 62 supported by a vertical base plate 63 mounted on a bracket 64 secured to the machine frame portion 54. A cylindrical housing 67 is mounted on the bearing 62 for rotation and carries a plate member 68 which supports a set of diametrically opposed or upper and lower brackets 71 and 72, respectively.

Each of the brackets 71 and 72 supports a wire gripping unit 75, and each unit 75 includes a double acting fluid or air actuated wire gripping cylinder 76 pivotally supported by a pin 77 connected to its corresponding support bracket. A tubular finger 79 projects from each of the actuating cylinders 76 and encloses a piston rod which moves axially within the tubular finger 79. As described in above-mentioned U.S. Pat. No. 3,857,172, each of the tubular fingers 79 has a recess or notch 82, and the notches 82 are adapted to receive the corresponding wires W1 and W2 leading from the fliers 35, and the wires are gripped by extension of the piston rods within the tubular fingers 79.

Each of the gripping cylinders 76 is pivoted on its corresponding support pin 77 by actuation of a corresponding double-acting fluid or air cylinder 86 pivotally connected to its corresponding bracket 71 or 72 by a pivot pin 87. Each of the cylinders 86 has a piston rod 89 pivotally connected to its corresponding cylinder 76 by a pivot pin 91. It is thus apparent that when the cylinders 86 are actuated to retract the corresponding piston rods 89, the corresponding wire gripper actuating cylinder 76 pivot outwardly away from the axis of the shield assembly 45 but within a plane which includes the axis of the shield assembly as well as the axes of the cylinders 76 and 86.

Figure 3:
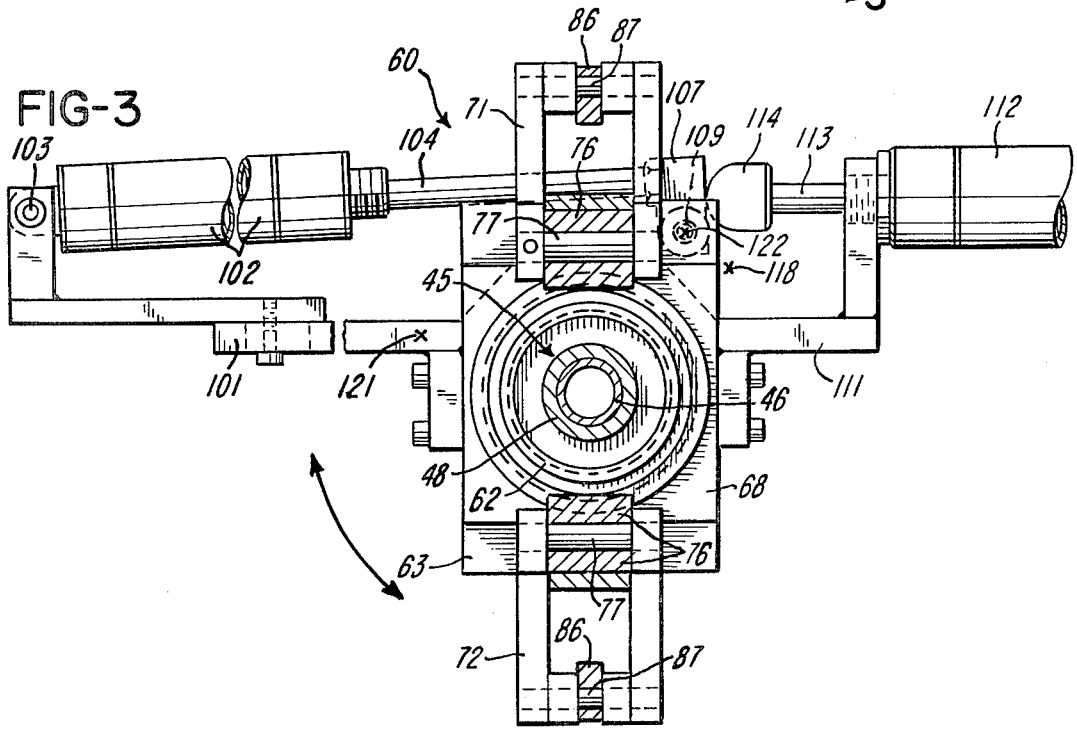
FIG. 3 is a fragmentary section of the lead wire gripper assembly as taken generally on line 3—3 of FIG. 2.

As shown in FIG. 3, a Z-shaped arm 101 is mounted on one side of the base plate 63, and a double-acting fluid or air actuated cylinder 102 is supported by the arm 101 for pivotal movement by pivot pin 103. The cylinder 102 has a piston rod 104 which carries an end block 107 pivotally connected to the block 68 by a pivot screw or pin 109 (FIG. 2). Another Z-shaped bracket 111 (FIG. 3) is secured to the other side of the base plate 63 and supports another double-acting fluid cylinder 112 having a piston rod 113. A rounded stop member 114 is secured to the outer end of the piston rod 113 which is illustrated in its extended position in FIG. 3.

When the piston rod 113 and stop member 114 are retracted by actuation of the cylinder 112, and the cylinder 102 is actuated for fully extending the piston rod 104, the pivot pin 109 rotates the lead wire gripper assembly 60 clockwise (FIG. 3) until the pivot pin 109 is located at a lead pick-up position 118 where the plane of the cylinders 76 and 86 and gripping fingers 79 is located at approximately a two-o'clock position. When the cylinder 102 is actuated to retract the piston rod 104, the wire gripper assembly 60 is rotated counter-clockwise (FIG. 3) until the pivot pin 109 is located at a lead terminating position 121 where the plane of the cylinders 76 and 86 and wire gripping fingers 79 is located between a nine-o'clock position and ten-o'clock position. When the cylinder 112 is actuated to extend the piston rod 113 and stop member 114 to a position as shown in FIG. 3, and the cylinder 102 is actuated to extend the piston rod 104, the block member 107 engages the stop member 114 where the pivot pin 109 is located at a coil winding position 122 as shown in FIG. 3. In this position, the plane of the cylinders 76 and 86 and the gripping fingers 79 is in a substantially vertical position, as apparent from FIG. 3.

In a typical operation of the automatic armature winding machine constructed in accordance with the invention, the wires W1 and W2 extending from the flyers 35 are initially manually connected to the wire gripping fingers 79. By actuation of the fliers 35 and outer shield 48, the wires are connected or hooked to the first pair of tangs. Then the successive pairs of coils 24 are wound in a conventional manner with the lead wires between successive coils hooked to corresponding pairs of tangs after the winding of each pair of coils 24. As mentioned above, the lead wires may be hooked or looped over the corresponding tangs or alpha-type connections may be made between the lead wires and their respective commutator tangs. While the coils are being wound and the lead connections are being made after each index of the armature, the gripper assembly 60 is retained in the winding position shown in FIG. 3 where the pivot pin 109 is located at the winding position 122.

After the final pair of coils 24 are wound, the gripper assembly 60 is rotated clockwise (FIG. 3) until the pivot pin 109 is located at the lead pick up position 118. In this position, the gripper fingers 79 and notches 82 are ideally positioned for receiving the wires W1 and W2 extending from the flyers 35. The cylinders 86 are actuated to extend the piston rods 89 so that the gripping fingers 79 are pivoted inwardly as shown in FIG. 2 prior to gripping the wires. The wound armature is simultaneously indexed until the final commutator tangs are in a vertical plane. The gripper assembly 60 is then rotated or indexed counter-clockwise (FIG. 3) to a vertical position with the lead wires being gripped by the gripping finger 79. The cylinders 86 are then actuated to retract the piston rods 89 whereby the wires W1 and W2 are pulled from the final commutator tangs, causing the wires to be cut or terminated by the edges of the tangs.

The first wound armature is then automatically removed from the winding station, and an unwound armature is inserted into the winding station between the winding forms or chucks 28. While the gripper assembly 60 is located at the winding position 122, the lead wires are hooked or connected to the first pair of commutator tangs by a sequence operation of the flyers 35 and the outer commutator shield 48, as mentioned above. As the armature is indexed to a position for winding the first pair of coils 24 on the armature core 16, the gripper assembly 60 remains at a position where the pivot pin 109 is located at the winding position 122. After the first pair of coils are fully wound, the gripper assembly 60 is indexed counter-clockwise to the terminating position 121. The cylinders 86 are then actuated to retract the piston rods 89 for pulling the wire loops extending around the gripper fingers 79 from the initial pair of commutator tangs, causing the wires to be cut or terminated directly at the tangs. After the gripper assembly 60 is indexed clockwise back to the winding position 122, all the remaining armature coils are wound with the tang connections between each pair of adjacent coils, and the lead wires are terminated from the final pair of tangs in the manner described above.

From the drawings and the above description, it is apparent that an automatic armature winding machine constructed in accordance with the present invention, provides desirable features and advantages. For example, a primary advantage is provided by the rotatable gripper assembly 60 which enables the wire gripping fingers 79 to remain attached to the leading end portions of fine wires W1 and W2 until after the first pair of tangs are connected and the winding of the first pair of coils is at least initiated. As a result, there is no chance of the wires W1 and W2 being disconnected or pulled from the first pair of corresponding commutator tangs when the armature is indexed to the position for winding the first pair of coils. That is, when the armature is indexed after the wires are connected to the first pair of tangs, the gripper assembly is also indexed or rotated in the same direction so that the gripper fingers 79 remain close to the first pair of tangs for retaining the lead end portions of the wires until after the winding of the first pair of coils is initiated. Thus the invention eliminates the need for double wrapping the fine wires around the first pair of commutator tangs to prevent the wires from slipping from the tangs and, more importantly, eliminates the additional time required for double wrapping the commutator tangs, thereby reducing the overall time required for winding each armature.

While the method and form of armature winding apparatus herein described constitute a preferred embodiment of the invention, it is to be understood that the invention is not limited to the precise method and form of apparatus described, and that changes may be made therein without departing from the scope and spirit of the invention as defined in the appended claims.

We claim:

1. In apparatus for winding an armature having a shaft supporting a core and a commutator having laterally spaced hook-shaped commutator tangs, said apparatus including means for supporting an armature at a winding station, power driven winding means supported for rotation relative to said supporting means for successively winding at least one wire into a series of coils on the core, means for selectively presenting each of the commutator tangs for receiving a lead wire extending from a coil to said winding means, and wire gripping means for engaging the wire extending from said winding means to the coil, the improvement comprising means supporting said wire gripping means for rotation on generally the axis of the armature shaft from a first position where the wire is engaged by said wire gripping means to a second position disposed at a substantial angle from said first position where the wire is severed generally adjacent a commutator tang.

2. Apparatus as defined in claim 1 wherein said means supporting said wire gripping means comprise an annular member disposed concentrically with the armature shaft, said wire gripping means including a fluid actuated wire gripper unit supported by said member for pivotal movement, and power actuated means for rotating said member and said gripper unit.

3. Apparatus as defined in claim 1 and including power operated means for rotating said wire gripping means and effective to position said gripping means at a third position intermediate said first and second positions to facilitate winding the coils on the armature coil.

4. Apparatus as defined in claim 3 wherein said power operated means for rotating said wire gripping means comprise a set of fluid actuated cylinders arranged to move and hold said gripping means at said first, second and third position.

5. Apparatus as defined in claim 3 wherein one of said fluid cylinders is actuated to form a stop for said wire gripping means at said third position.

6. Apparatus as defined in claim 1 wherein said wire gripping means comprise a pair of diametrically opposed fluid actuated wire gripper units, an annular support member disposed substantially concentrically with the axis of the armature shaft and supporting said gripper units for pivotal movement, and power operated means for rotating said support member and said gripper units.

7. Apparatus as defined in claim 6 and including a set of fluid actuated pivot cylinders connected to pivot said gripper units, and said pivot cylinders and said gripper units are disposed generally in a common plane extending through the axis of the armature shaft.

8. Apparatus as defined in claim 1 wherein said means for selectively presenting each of the commutator tangs for receiving a lead wire comprise a tubular shield having an end portion receiving the commutator and armature shaft, and said means supporting said wire gripping means comprise a member surrounding said shield and supported for rotation on the axis of said shield.

9. In apparatus for winding an armature having a shaft supporting a core and a commutator having laterally spaced hook-shaped commutator tangs, said apparatus including means for supporting an armature at a winding station, power driven winding means supported for rotation relative to said supporting means for successively winding at least one wire into a series of coils on the core, means for selectively presenting each of the commutator tangs for receiving a lead wire extending from a coil to said winding means, wire gripping means for engaging the wire extending from said winding means to the coil, and first fluid actuated means for operating said wire gripping means, the improvement comprising means supporting said wire gripping means and said first fluid actuated means for rotation on generally the axis of the armature shaft from a first position where the wire is engaged by said wire gripping means to a second position disposed at a substantial angle from said first position where the wire is severed generally adjacent a commutator tang, and second fluid actuated means for rotating said wire gripping means and said first fluid actuated means between said first and second positions.

10. Apparatus as defined in claim 9 wherein said second fluid actuated means are effective to position said gripping means and said first fluid actuated means at a third position intermediate said first and second positions to facilitate winding the coils on the armature core.

11. Apparatus as defined in claim 10 wherein said second fluid actuated means for rotating said wire gripping means comprise a set of fluid actuated cylinders arranged to move and hold said gripping means at said first, second and third position.

12. Apparatus as defined in claim 9 wherein said wire gripping means comprising a pair of diametrically arranged and pivotally supported fluid actuated wire grippers, and a corresponding pair of fluid actuated cylinders connected to pivot said grippers and to rotate with said grippers on the axis of the armature shaft.

13. A method of winding an armature including a shaft supporting a core and a commutator having peripherally spaced commutator bars, comprising the steps of inserting the armature into a winding machine having power operated wire winding means, winding a wire on the core with the winding means to form a wire coil, gripping the wire leading from the winding means to the core with a power operated wire gripper located at a first position, attaching the wire onto a commutator bar with power operated means, rotating the wire gripper about the axis of the armature shaft with power operated means to a second position disposed as a substantial angle relative to the first position, and severing the wire at the second position generally adjacent the commutator bar with power operated means.

14. A method as defined in claim 13 and including the step of stopping the wire gripper at a third position between said first and second positions with power operated means to facilitate winding of the coils.

* * * * *